(12) United States Patent
Shamai et al.

(10) Patent No.: US 11,677,566 B2
(45) Date of Patent: *Jun. 13, 2023

(54) SYSTEMS AND METHODS FOR SIGNING OF A MESSAGE

(71) Applicant: GK8 LTD, Tel Aviv (IL)

(72) Inventors: Shahar Shamai, Rehovot (IL); Lior Lamesh, Rishon-LeZion (IL); Tal Shalti, Tel-Aviv (IL); Matan Orland, Tel-Aviv (IL)

(73) Assignee: GK8 LTD, Tel Aviv (IL)

( * ) Notice: Subject to any disclaimer, the term of this patent is extended or adjusted under 35 U.S.C. 154(b) by 116 days.

This patent is subject to a terminal disclaimer.

(21) Appl. No.: 17/396,831

(22) Filed: Aug. 9, 2021

(65) Prior Publication Data

US 2021/0367793 A1 Nov. 25, 2021

Related U.S. Application Data

(63) Continuation of application No. 16/559,693, filed on Sep. 4, 2019, now Pat. No. 11,088,851.

(51) Int. Cl.
*H04L 9/32* (2006.01)
*H04L 9/00* (2022.01)
*H04L 9/14* (2006.01)

(52) U.S. Cl.
CPC ............ *H04L 9/3252* (2013.01); *H04L 9/008* (2013.01); *H04L 9/14* (2013.01)

(58) Field of Classification Search
CPC .......... H04L 9/008; H04L 9/14; H04L 9/3252
See application file for complete search history.

(56) References Cited

U.S. PATENT DOCUMENTS

| 6,845,447 B1 * | 1/2005 | Fujioka | H04L 9/3257 705/12 |
| 8,326,996 B2 * | 12/2012 | Wong | G06F 16/252 709/228 |
| 8,634,559 B2 * | 1/2014 | Brown | H04L 9/3252 340/12.51 |

(Continued)

FOREIGN PATENT DOCUMENTS

WO WO 2021/044411 3/2021

OTHER PUBLICATIONS

International Search Report and the Written Opinion dated Feb. 9, 2021 From the International Searching Authority Re. Application No. PCT/IL2020/050949. (13 Pages).

(Continued)

*Primary Examiner* — Gary S Gracia

(57) ABSTRACT

There is provided a requestor device for digital signing of a message, comprising: at least one hardware processor executing a code for: transmitting the message for signing thereof, in a single request session over the network to each one of a plurality of validator devices, wherein a beacon device computes and transmits over a network to each one of a plurality of validator devices a signature-data value computed and signed by the beacon device, receiving in a single response session from each one of the plurality of validator devices, a respective partial-open decrypted value computed for the signature-data value and the message, and aggregating the partial-opens decrypted values received from the plurality of validator devices to compute the digital signature of the message.

20 Claims, 6 Drawing Sheets

(56) References Cited

U.S. PATENT DOCUMENTS

| | | | | |
|---|---|---|---|---|
| 10,149,159 | B1* | 12/2018 | Perfitt | H04L 9/3265 |
| 10,219,106 | B1* | 2/2019 | Lam | H04W 12/108 |
| 2006/0143701 | A1* | 6/2006 | Dos Santos | H04L 63/0428 |
| | | | | 726/14 |
| 2007/0055878 | A1* | 3/2007 | Sandhu | H04L 63/08 |
| | | | | 713/171 |
| 2007/0244817 | A1* | 10/2007 | Dolivo | H04L 9/3263 |
| | | | | 705/50 |
| 2008/0235510 | A1* | 9/2008 | Wolf | H04L 9/302 |
| | | | | 713/161 |
| 2010/0046749 | A1* | 2/2010 | Hatano | H04L 9/088 |
| | | | | 380/44 |
| 2011/0138183 | A1* | 6/2011 | Reddy | H04W 12/08 |
| | | | | 713/168 |
| 2013/0195274 | A1* | 8/2013 | Nakashima | H04L 9/3006 |
| | | | | 380/282 |
| 2014/0316992 | A1* | 10/2014 | Povolny | G07B 15/00 |
| | | | | 705/71 |
| 2015/0104004 | A1* | 4/2015 | Holman | H04W 12/64 |
| | | | | 380/28 |
| 2015/0332248 | A1* | 11/2015 | Weksler | H04W 24/08 |
| | | | | 726/3 |
| 2016/0072623 | A1* | 3/2016 | Joye | H04L 9/3255 |
| | | | | 380/28 |
| 2017/0316390 | A1* | 11/2017 | Smith | H04L 9/0637 |
| 2018/0219869 | A1* | 8/2018 | Kumar | H04W 4/025 |
| 2018/0241565 | A1* | 8/2018 | Paolini-Subramanya | |
| | | | | H04L 9/0637 |
| 2018/0276745 | A1* | 9/2018 | Paolini-Subramanya | |
| | | | | G06Q 20/382 |
| 2018/0316502 | A1* | 11/2018 | Nadeau | H04L 9/0637 |
| 2018/0359811 | A1* | 12/2018 | Verzun | H04W 28/12 |
| 2019/0036908 | A1* | 1/2019 | Liu | H04W 12/03 |
| 2019/0098555 | A1* | 3/2019 | Winterton | H04W 40/244 |
| 2019/0140819 | A1* | 5/2019 | Dolev | H04L 63/0823 |
| 2019/0372765 | A1* | 12/2019 | Tegeder | H04L 9/0894 |
| 2021/0067345 | A1* | 3/2021 | Shamai | H04L 9/14 |

OTHER PUBLICATIONS

Notice of Allowance dated Apr. 30, 2021 from the US Patent and Trademark Office Re. U.S. Appl. No. 16/559,693. (22 pages).
Boneh et al. "Using Level-1 Homomorphic Encryption to Improve Threshold DSA Signatures for Bitcoin Wallet Security", Progress in Cryptology, LATINCRYPT 2017, 5th International Conference on Cryptology and Information Security in Latin America. Havana, Cuba, Sep. 20-22, 2017, Revised Selected Papers, LNCS 11368: 352-377, 2019.
Damgard et al. "A Generalization of Paillier's Public-Key System With Applications to Electronic Voting", International Journal of Information Security, 9(6): 371-385, Published Online Sep. 30, 2010.
Galindo et al. "A Practical Public Key Cryptosystem From Paillier and Rabin Schemes", Proceedings of the 6th International Workshop on Theory and Practice in Public Key Cryptography: Public Key Cryptography, PKC 2003, LNCS 2567: 279-291, Published Online Dec. 18, 2002.
Hatano et al.
Shamir "How to Share A Secret", Communications of the ACM, 22(11): 612-613, Nov. 1979.

* cited by examiner

SYSTEMS AND METHODS FOR SIGNING OF A MESSAGE

RELATED APPLICATION

This application is a continuation of U.S. patent application Ser. No. 16/559,693 filed on Sep. 4, 2019. The contents of the above application are all incorporated by reference as if fully set forth herein in their entirety.

FIELD AND BACKGROUND OF THE INVENTION

The present invention, in some embodiments thereof, relates to network security and, more specifically, but not exclusively, to systems and methods for digital signing of a message transmitted over a network.

Messages sent over an insecure channel, such as a publicly accessible network, require a mechanism to enable the receiver to trust that the originator actually sent the message. Cryptographic methods are used to digitally sign the message.

Digital signing of messages is used, for example, in blockchain environments, to verify the authenticity of a transaction, for example, transfer of cryptocurrencies from one digital wallet to another digital wallet.

SUMMARY OF THE INVENTION

According to a first aspect, a requestor device for digital signing of a message, comprises: at least one hardware processor executing a code for: transmitting the message for signing thereof, in a single request session over the network to each one of a plurality of validator devices, wherein a beacon device computes and transmits over a network to each one of a plurality of validator devices a signature-data value computed and signed by the beacon device, receiving in a single response session from each one of the plurality of validator devices, a respective partial-open decrypted value computed for the signature-data value and the message, and aggregating the partial-opens decrypted values received from the plurality of validator devices to compute the digital signature of the message.

According to a second aspect, a system for digital signing of a message, comprises: a plurality of validator devices, each including at least one hardware processor executing a code for: receiving from a beacon device over a network a signature-data value computed and signed by the beacon device, receiving the message for signing thereof from a requestor device over the network in a single request session, computing a respective partial-open decrypted value of the signature-data value and the message, and transmitting the respective partial-open decrypted value to the requestor device in a single response session, wherein the requestor device aggregates the partial-open decrypted values received from the plurality of validator devices to compute the digital signature of the message.

According to a third aspect, a system for digital signing of a message, comprises: (A) at least one hardware processor of a beacon device executing a code for: computing and transmitting over a network to each one of a plurality of validator devices: a signature-data value computed and signed by the beacon device, (B) a plurality of validator devices, each including at least one hardware processor executing a code for: receiving the message for signing thereof from a requestor device over the network in a single request session, computing a respective partial-open decrypted value for the signature-data value and the message, and transmitting the respective partial-open decrypted value to the requestor device in a single response session, wherein the requestor device aggregates the partial-open decrypted values to compute the digital signature of the message.

In a further implementation of the first, second, and third aspects, further comprising code for identifying which of the plurality of validator devices is malicious when the digital signature is not validated, by comparing, for each respective validator device of the plurality of validator device, a first value computed using unique values for the respective validator device provided by the beacon device and using the message, with a second value computed using an indication of proof provided by the respective validator device based on the unique values and the message.

In a further implementation of the first, second, and third aspects, further comprising code for validating that the digital signature computed by aggregating the partial-open decrypted values received from the plurality of validator devices is a valid signature of the message.

In a further implementation of the first, second, and third aspects, further comprising code for computing an unencrypted signature of the message from the partial open decrypted values.

In a further implementation of the first, second, and third aspects, the requestor device is one of the plurality of validator devices.

In a further implementation of the first, second, and third aspects, further comprising code for checking whether the message qualifies for signing by each respective validator device of the plurality of validator devices according to a respective set-of-rules.

In a further implementation of the first, second, and third aspects, further comprising code for validating that the beacon device signed the signature-data value and that the signature-data value has not been previously used.

In a further implementation of the first, second, and third aspects, further comprising code for computing and transmitting over the network to each one of the plurality of validator devices, a public key, and a respective split-private key of a plurality of split-private keys, wherein the signature-data value includes a DSA-private key computed by the beacon device using a digital signature algorithm (DSA) process, wherein the DSA-private key is at least one of: encrypted with the public key corresponding to the private key that is split into the plurality of split-private keys computed based on an encryption process that is additive homomorphic and includes a threshold decryption process, and each one of the plurality of validator devices further includes code for computing the respective partial-open decrypted value using the respective split-private key applied to the signature-data value and the message.

In a further implementation of the first, second, and third aspects, a signature-data value and a private key are split and shared with each one of the plurality of validator devices using a secret sharing process satisfying the property of level-1 homomorphic sum secret sharing by enabling a multiplication operation of encrypted values.

In a further implementation of the first, second, and third aspects, the signature-data value that is split and shared is selected from a plurality of signature-data values and the private key that is split and shared is selected from a plurality of private keys used to compute the respective partial-open decrypted values, without the plurality of validator devices knowing the certain signature data value and the certain private key that is selected.

In a further implementation of the first, second, and third aspects, the signature-data value is shared with each one of the plurality of validator devices using a secret sharing process that is homomorphic to addition, and each one of the plurality of validator devices further includes code for computing the respective partial-open decrypted value based on the secret sharing process.

In a further implementation of the first, second, and third aspects, a number of the plurality of split-private keys corresponds to a number of validator devices, and the digital signature of the message is computed only when all of the number of the plurality of validator devices provide respective partial-open decrypted values.

In a further implementation of the first, second, and third aspects, further comprising defining a minimum security level of a number of validator device out of a total number of validator devices required to provide respective partial-open decrypted values for computing of the digital signature of the message, increasing the minimum security level to a minimum threshold according to a set of rules, wherein a number of the plurality of split-private keys corresponds to the total number of validator devices, and the digital signature of the message is computed when the number of the plurality of validator devices provide respective partial-open decrypted values is above the minimum threshold.

In a further implementation of the first, second, and third aspects, further comprising dividing a total number of validator devices into at least two groups, providing by the beacon device a unique signature-data value for each of the at least two groups, wherein the digital signature of the message is computed only when all of the validator devices of each group provide respective partial-open decrypted values computed using respective unique signature-data values for each of the at least two groups.

In a further implementation of the first, second, and third aspects, the message for signing thereof is transmitted by a requestor device, in a single request session over the network to each one of the plurality of validator devices, a respective partial-open decrypted value of the signature-data value and the message is received by the requestor device in a single response session from each one of the plurality of validator devices, and the partial-open decrypted values received from the plurality of validator devices are aggregated by the requestor device to compute the digital signature of the message.

In a further implementation of the first, second, and third aspects, the DSA process comprises an Elliptic Curve DSA (ECDSA).

In a further implementation of the first, second, and third aspects, the DSA process comprises an Edwards-curve DSA (EdDSA) process.

In a further implementation of the first, second, and third aspects, the signature-data value includes the following components: (i) an inverse of a random value encrypted with the public key corresponding to the private key that is split into the plurality of split-private keys computed based on an encryption process that is additive homomorphic and includes a threshold decryption process, and (ii) an encryption of the following with the public key corresponding to the private key that is split into the plurality of split-private keys computed based on an encryption process that is additive homomorphic and includes a threshold decryption process: a product of the inverse of the random value and a hash of a known constant point raised to the power of the random value and a DSA-private key computed by the beacon device using a DSA process.

In a further implementation of the first, second, and third aspects, the signature-data value includes the following components: (i) an inverse of a random value split into a plurality of first components using a secret sharing process that is homomorphic to addition, and (ii) splitting the following into a plurality of second components using the secret sharing process: a product of the inverse of the random value and the hash of the known constant point raised to the power of the random value and an EdDSA-private key computed by the beacon device using EdDSA, wherein each of the plurality of validator devices is provided with a respective first and second component.

In a further implementation of the first, second, and third aspects, the signature-data value further includes: (iii) the hash of the known constant point raised to the power of the random value.

In a further implementation of the first, second, and third aspects, the DSA-private key of the signature-data value is generated using an hd-tree enabling deriving DSA-private keys from a base DSA-private key using a derivation index value, and wherein the derivation index value is provided to the plurality of validator devices for locally computing the signature-data value.

In a further implementation of the first, second, and third aspects, the DSA-private key comprises an EdDSA-private key, and the hd-enabling deriving DSA-private keys from the base DSA-private key comprises deriving EdDSA-private keys from the base EdDSA-private key.

In a further implementation of the first, second, and third aspects, the DSA-private key comprises an ECDSA-private key, and the hd-enabling deriving DSA-private keys from the base DSA-private key comprises deriving ECDSA-private keys from the base ECDSA-private key.

In a further implementation of the first, second, and third aspects, the public key and the private key that is split into the plurality of split-private keys are computed based on a threshold decryption process, and further comprising code for: computing a plurality of DSA key pairs, encrypting each private key of the plurality of DSA key pairs to create a plurality of encrypted private keys, providing the plurality of encrypted private keys to the plurality of validator devices, selecting one of the plurality of encrypted private keys, wherein the signature-data value does not include the selected private key, providing an indication of the selected encrypted private key to the plurality of validator devices, wherein the partial open decrypted value is computed using the selected encrypted private key and the signature-data value which does not include the selected private key.

In a further implementation of the first, second, and third aspects, the DSA process comprises EdDSA, and further comprising code for: computing a plurality of EdDSA key pairs, encrypting each private key of the plurality of EdDSA key pairs to create a plurality of encrypted private keys, providing the plurality of encrypted private keys to the plurality of validator devices, selecting one of the plurality of encrypted private keys, wherein the signature-data value does not include the selected private key, providing an indication of the selected encrypted private key to the plurality of validator devices, wherein the partial open decrypted value is computed using the selected encrypted private key and the signature-data value which does not include the selected private key.

In a further implementation of the first, second, and third aspects, the DSA process comprises ECDSA, and further comprising code for: computing a plurality of ECDSA key pairs, encrypting each private key of the plurality of ECDSA key pairs to create a plurality of encrypted private keys, providing the plurality of encrypted private keys to the plurality of validator devices, selecting one of the plurality of encrypted private keys, wherein the signature-data value does not include the selected private key, providing an indication of the selected encrypted private key to the plurality of validator devices, wherein the partial open decrypted value is computed using the selected encrypted private key and the signature-data value which does not include the selected private key.

In a further implementation of the first, second, and third aspects, further comprising: splitting a plurality of encrypted private keys, selecting any one of the split plurality of encrypted private keys, splitting a plurality of signature-data values, selecting any one of the split signature-data values, and providing the selected split encrypted key and the selected split signature-data value to plurality of validator devices using a secret sharing process satisfying the property of level-1 homomorphic secret sharing by enabling a multiplication operation of encrypted values.

In a further implementation of the first, second, and third aspects, the level-1 homomorphic secret sharing comprises level-1 homomorphic sum secret sharing.

In a further implementation of the first, second, and third aspects, the beacon device computes and transmits a plurality of instances of the signature-data value, without triggering by the message.

In a further implementation of the first, second, and third aspects, the beacon device is connected to the network in a unidirectional manner such that traffic is transmitted from the beacon to the network but not in a direction from the network to the beacon.

In a further implementation of the first, second, and third aspects, the beacon device is implemented as a cold offline wallet that is connected to a hot wallet implemented as the requestor device.

In a further implementation of the first, second, and third aspects, the message includes a transaction of cryptocurrency for storage as a record in a blockchain.

In a further implementation of the first, second, and third aspects, the beacon repeatedly computes and transmits the signature-value.

In a further implementation of the first, second, and third aspects, after an initialization process, the beacon device computes and transmits a defined number of instances of different public keys, corresponding private keys, and signature-data values, wherein the plurality of validator devices sign up to the predefined number of messages.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
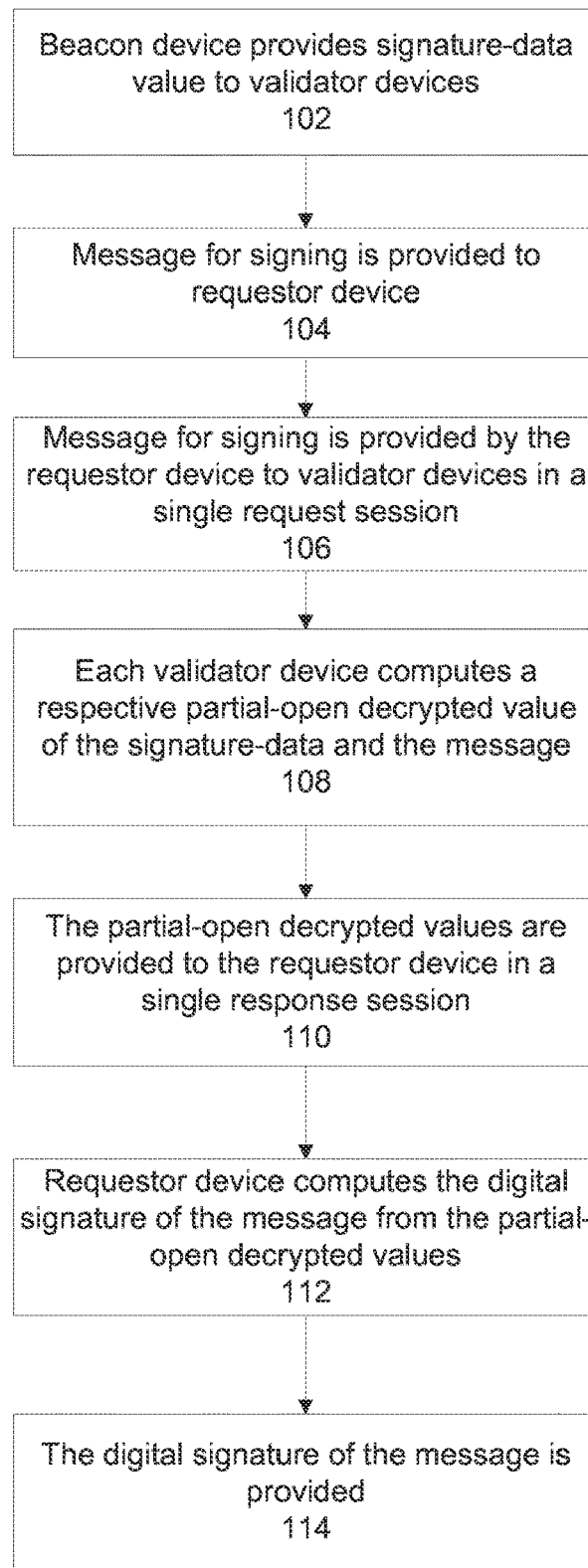
FIG. 1 is a flowchart of a method for digital signing of a message using signature-data provided by a beacon device and a single request session by a requestor device and a single response session from each of multiple validator devices, in accordance with some embodiments of the present invention.

The present invention, in some embodiments thereof, relates to network security and, more specifically, but not exclusively, to systems and methods for digital signing of a message transmitted over a network.

An aspect of some embodiments of the present invention relates to requestor device, a system, a method, and/or code instructions (i.e., stored on a data storage device and executable by hardware processor(s)) for digital signing of a message. The requestor device transmits, in a single request session, the message to be signed to each one of multiple validator devices. At least a predefined number out of a total number of validator devices, or all validator devices, are required to sign the message. A beacon device computes and signs a signature-data value, and transmits the signature-value to each one of the validator devices. Each of the validator devices computes a respective partial-open decrypted value for the signature-data value and the message. The validator device receives, in a single response session, the respective partial-open decrypted value from each one of the validator devices. The requestor devices aggregates the partial-open decrypted values to compute the digital signature of the message.

An aspect of some embodiments of the present invention relates to validator devices, a system, a method, and/or code instructions (i.e., stored on a data storage device and executable by hardware processor(s)) for digital signing of a message. Each one of the validator devices, or at least a minimum number of validator devices of a total number of validator devices, receives a respective copy of a signature-data value computed by a beacon device, and receives the message for signing from a requestor device. The message for signing is received from the requestor device in a single request session. Each validator device computes a respective partial-open decrypted value of the signature-data value and the message. Each respective partial-open is transmitted to the requestor device in a single response session. The requestor device aggregates the multiple received partial-open decrypted values to compute the digital signature of the message.

An aspect of some embodiments of the present invention relates to a system, devices, a method, and/or code instructions (i.e., stored on a data storage device and executable by hardware processor(s)) for digital signing of a message. A beacon device computes and signs a signature-data value. The signature-data value is provided to multiple validator devices. Each one of the validator devices, or at least a minimum number of validator devices of a total number of validator devices, receives a respective copy of the signature-data value, and receives the message for signing from a requestor device. The message for signing is received from the requestor device in a single request session. Each validator device may verify that the message qualifies for signing by the respective validator device, for example, satisfying a set of rules. Each validator device computes a respective partial-open decrypted value of the signature-data value and the message. Each respective partial-open is transmitted to the requestor device in a single response session. The requestor device aggregates the multiple received partial-open decrypted values to compute the digital signature of the message.

The signature-data value may be provided to the multiple validator devices using an additive homomorphic secret sharing process (e.g., as described with reference to https://www(dot) semantic scholar(dot)org/paper/Using-Level-1-Homomorphic-Encryption-to-Improve-DSA-Boneh-Gennaro/a57ae12ec05a71b22ce6504dce29c37c3f86d6fc, the secret sharing process as described hereinbelow, Shamir's Secret Sharing, and/or Sum Secret Sharing) and/or using a an encryption scheme with the possibility of a threshold decryption such as a multi-party computation (MPC) threshold process, for example, Paillier.

The message may be signed based on a Digital Signature Algorithm (DSA) process, optionally, any variant of Schnorr signatures, for example, Elliptic Curve Digital Signature Algorithm (ECDSA), and/or Edwards-curve Digital Signature Algorithm (EdDSA)).

The beacon may be designed to be secure against malicious attack and/or tampering. Optionally, the beacon is connected to the network in a unidirectional manner such that traffic is transmitted only from the beacon to the network, but not in a direction from the network to the beacon. The unidirectional setup may provide an extra layer of protection against network based malicious access. The beacon may be implemented as a cold offline wallet storing cryptocurrency that is connected to the network in a unidirectional manner, for example, to a hot wallet implemented as the requestor device. The beacon may repeatedly compute and transmit the signature-data value, without requiring an external trigger, for example, without being triggered by the message that is signed using the signature-data value. Alternatively or additionally, the beacon device transmits data as described herein after an initialization process.

At least some implementations of the systems, methods, apparatus, and/or code instructions described herein improve the technology of computationally efficient digital signing of messages, for example, digital signing of transactions records in a publicly accessible network, for example, digital signing of cryptocurrency transactions. At least some implementations of the systems, methods, apparatus, and/or code instructions described herein address the technical problem of cybersecurity, in particular, messages that are digitally signed using encrypted processes due to the nature of the publicly accessible network, enabling a malicious entity to attempt to hack and/or access the messages, for example, in an attempt to steal the cryptocurrency in the transaction. The technical problem is in order to prevent malicious attacks, the encryption processes used to encrypt the message are becoming increasingly complex, to the point that the computational strain put on the network becomes increasingly impractical to implement the complex secure encryption processes.

Some signing processes are based on MPC, where the device requests that multiple other validator devices digitally sign the message together. MPC signing processes require multiple rounds of data transmissions in order to coordinate the common signing, for example, each validator device communicates with all other validator devices. The data for coordinating the shared signing is problematic in the network environment for multiple reasons, for example, incurring significant delays due to transmission of the data over multiple rounds, significant processing resources of each validator device to process encrypted data multiple times and/or for processing the transmitted and received data. The network delays and/or processor utilization is especially problematic when the messages are signed in a blockchain environment (e.g., cryptocurrency transactions) since each server hosting a copy of the blockchain needs to perform the encryption process as part of the blockchain protocol.

Although attempts have been made to improve the computational efficiency of MPC processes for digital signing of messages (e.g., in a public network environment, such as for cryptocurrency transactions recorded in a blockchain) a significant number of coordination rounds are still required. For example, the process described by "Using Level-1 Homomorphic Encryption To Improve Threshold DSA Signatures For Bitcoin Wallet Security", available for example, at https://www(dot)semanticscholar(dot)org/paper/Using-Level-1-Homomorphic-Encryption-to-Improve-DSA-Boneh-Gennaro/a57ae12ec05a71b22ce6504dce29c 37c3f86d6fc requires 4 rounds ($4n*(n-1)$ in a logical implementation) to achieve the digital signing.

Secure digital signing of messages using MPC is resource intensive. The amount of computation to sign the message requires significant computational resources, for example, processor utilization, memory, and/or network bandwidth to transmit messages between the signing entities. One standard solution is able to sign a message using 6 communication rounds, or possibly 4 communication rounds, where in each communication round each one of the multiple participating signers sends a message to all other signers. As such, the total number of messages that are transmitted across the network may be represented as about $4n*(n-1)$ messages in a logical implementation where n denotes the number of participating signers, and further includes a delay of 4 ping time. It is noted that actually the signers assume that they all start when all the signers want to sign the message. To get to that state, the signers need to add a further message from each signer to all other signers (i.e., $n-1$ messages) and one additional ping time. Moreover, each signing device implements complex and slow computations to perform their respective signing task, for example, zero knowledge proofs and additively homomorphic encryption.

In contrast, at least some of the implementations of the systems, methods, apparatus, and/or code instructions describe herein, which are based on the signature-data value outputted by the beacon device used in the process of signing the message by the multiple validator devices, reduces the number of messages to 2n−2 (exact in some implementations) and two ping times (including letting all validator devices know what to sign) which it is noted does not include the first ping to see which devices are available to sign. In some implementations, by cryptography used is computationally efficient and/or fast (e.g., when implementing Sum Secret Sharing), with no zero knowledge proofs. The computationally efficient and/or fast cryptography is enabled by the signature-data value outputted by the beacon device, as described herein.

At least some implementations of the systems, methods, apparatus, and/or code instructions described herein provide a beacon device that provides a signature-data value to the validator devices, which reduces the number of rounds for signing the message to a single round, including a single request session where the requestor terminal (that requests the signing) transmits data to the validator devices, and a single response session where the validator devices transmit data back to the requestor terminal. The single round is much more computationally efficient (e.g., in terms of processor utilization, network latency, network bandwidth) in comparison to other processes that require multiple coordination rounds.

The signature-data value is provided to multiple validator devices in a single transmit session, for example, using an additive homomorphic secret sharing process and/or an additive homomorphic multiparty encryption process, as described herein.

The beacon device may be designed to be tamper proof and/or secure, representing a trusted, uncompromised, authentic source of data. The beacon device may be connected to the network in a unidirectional manner, such that data may only be transmitted from the beacon device over the network, to the validator devices and/or the requestor device. The beacon device may be designed as a passive device that cannot be externally accessed by other network devices. The beacon device may be designed to operate automatically, for example, generating and transmitting data (e.g., keys, signature-data values) at predefined intervals (e.g., generated data may be time stamped). The beacon device may be implemented as, for example, a cold wallet storing cryptocurrency that is occasionally connected to the network for short time intervals.

The signature-data value, which is computed by the beacon device, and therefore represents a trusted, secure, non-comprised data generated by the beacon device, is validated by the validator devices as having been signed by the beacon device. The signature-data value may include a DSA-private key computed by the beacon device using a digital signature algorithm (DSA) process, optionally Elliptic Curve DSA and/or Edwards-curve DSA, where the private key is encrypted with the public key (corresponding to the private key that is split into the multiple split-private keys) computed based on an encryption process that is additive homomorphic and includes a threshold decryption process. Alternatively, the signature-data is shared with the validator devices using the secret sharing process described herein.

At least some implementations of the systems, methods, apparatus, and/or code instructions described herein improve the technology of multi-party computation (MPC) processes for signing of a message by using the signature-data values generated by the beacon device for reducing the number of transmission and reception sessions to a single transmission session followed by a single response session, i.e., a single round. In contrast, as described herein, other approaches for MPC signing are based on multiple transmit and multiple reception sessions (sometimes referred to as "rounds". The single transmit session and the single reception session as described herein refer to a single one way exchange of data involved in the signing of the message. The single session does not refer to bi-directional communication required to set-up the communication channel for transmission of the data over the single session, for example, it is assumed that bidirectional communication is performed based on one or more protocols such as TCP/IP. The single session is in contrast to multiple sessions (i.e., rounds) used by standard approaches, for example, where in order to sign a message, all the parties need to send all the other parties another message in 4 rounds (in a logical implementation), for example, resulting in 4n*(n−1) rounds where n denotes the number of signing parties.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
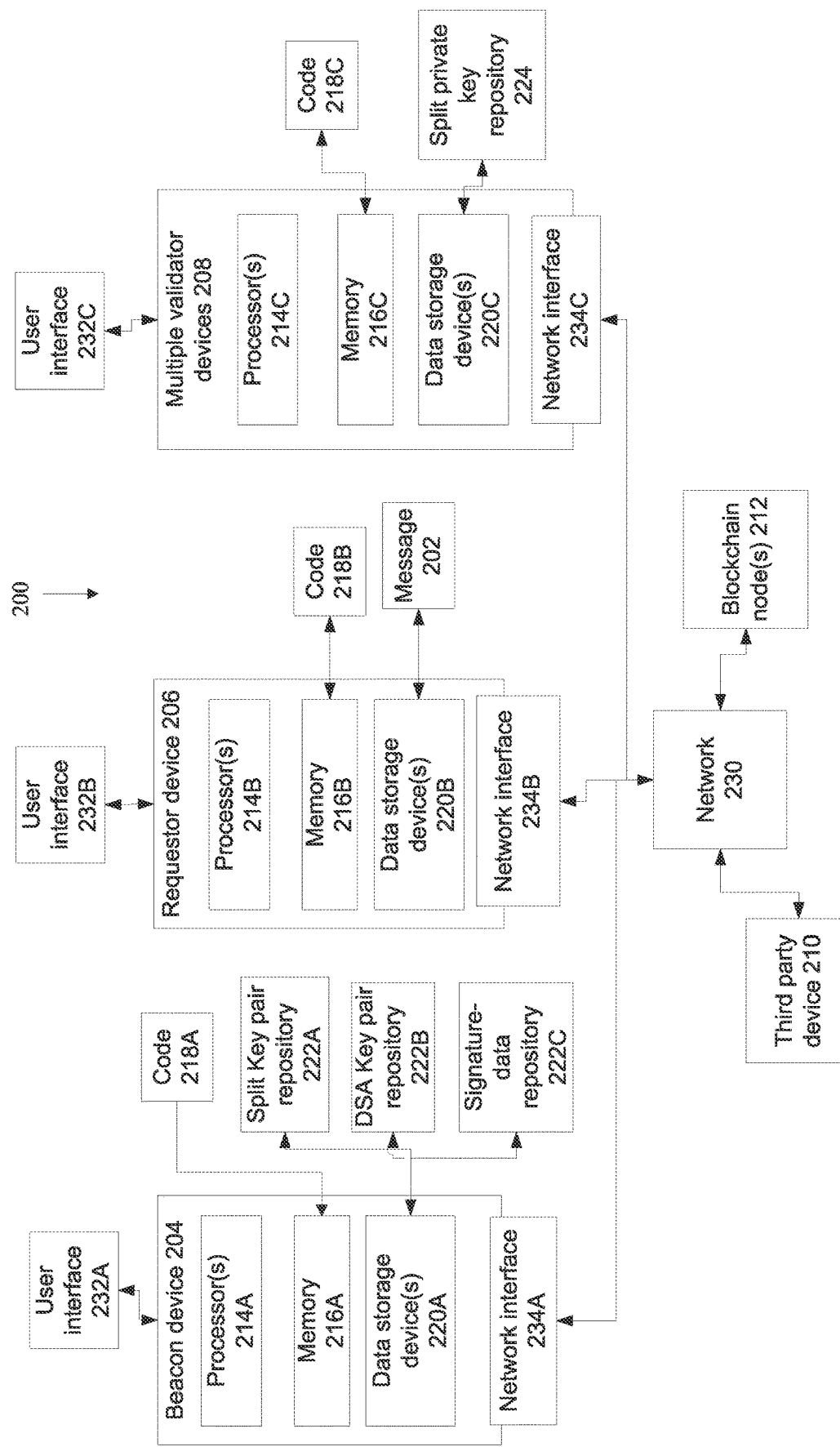
FIG. 2 is a block diagram of components of a system for digital signing of a message using signature-data provided by a beacon device and a single request session by a requestor device and a single response session from each of multiple validator devices 208, in accordance with some embodiments of the present invention.

Reference is now made to FIG. 1, which is a flowchart of a method for digital signing of a message using signature-data provided by a beacon device and a single request session by a requestor device and a single response session from each of multiple validator devices, in accordance with some embodiments of the present invention. FIG. 1 depicts an overall system level dataflow between multiple devices, including the beacon device, the requestor device, validator devices, and optionally a third party device. Reference is also made to FIG. 2, which is a block diagram of components of a system 200 for digital signing of a message 202 using signature-data provided by a beacon device 204 and a single request session by a requestor device 206 and a single response session from each of multiple validator devices 208, in accordance with some embodiments of the present invention. Components of system 200 may implement the acts of the method described with reference to FIG. 1 and/or FIG. 3-6, by code instructions stored in a memory executed by one or more hardware processors of one or more devices (e.g., beacon device 204, requestor device 206, multiple validator devices 208).

System 200 includes one or more the following components:

Beacon device 204 that provides the signature-data value to the validator devices 206.

Requestor device 206 that receives message 202 for signing thereof, and signs message 202 by coordination with multiple validator devices 208.

Multiple validator devices 208 that together provide a signature for message 202. It is noted that a single validator device 208 is depicted in FIG. 2 for simplicity and clarity of explanation, but it is understood that device 208 represents two or more validator devices. The number of validator devices 208 may be selected according to a desired security level, where a greater number of validator devices 208 provide increased security.

Third party device 210, which may provide message 202 to requestor device 206 for signing thereof.

Blockchain node(s) 212, each of which stores a copy of the blockchain that records the signed messages. For example, the blockchain stores records of signed transactions.

Beacon device 204, requestor device 206, validator devices 208, third party device 210, and blockchain nodes 212, may in communication with one another over a network 230.

Components of system 200 may be arranged into different architectures, by integrating two or more devices and/or one devices performs features of one or more other devices, for example one or a combination of the following:

Requestor device 206 is one of validator devices 208. Alternatively, any one of validator devices 208 may act as requestor 206.

Multiple validator devices 208 are blockchain nodes 212.

The communication channels between beacon 204 and/or requestor device 206 and/or validator devices 208 (e.g., over network 230) may be secure. Optionally, when beacon 204 sends data (e.g., signature-data) to validator devices 208 and/or requestor device 206, the validator devices 208 and/or requestor device 206 are the only devices authorized to read the sent data, and/or validate that the data was sent by beacon 204. The secure communication channel may be implemented, optionally over network 230, for example, as a direct cable link, and/or using a symmetrical encryption key that is common between beacon 204 and devices 206 and/or 208, and/or each of beacon 204 and devices 206 and/or 208 use a public key. In another example, the secure communication channel is established using a trusted controller, described with reference in U.S. Application No. 62/775,942, filed Dec. 6, 2018 "SECURE CONSENSUS OVER A LIMITED CONNECTION", including at least one shared inventor, incorporated herein by reference in its entirety.

Each device 204, 206, 208, 210, and/or 212 may be implemented as, for example, a mobile device, a stationary device, a desktop computer, a server, a smartphone, a laptop, a tablet computer, a wearable computing device, a glasses computing device, a watch computing device, a computing cloud, a virtual machine, and a virtual server.

It is noted that beacon device 204 may be implemented as a cold storage wallet.

Each device 204, 206, and/or 208 includes a respective processor 214A-C that executes respective code 218A-C stored in a respective memory 216A-C. Processor(s) 214A-C may be implemented as, for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 214A-C may be implemented as a single processor, a multi-core processor, and/or a cluster of processors arranged for parallel processing (which may include homogenous and/or heterogeneous processor architectures).

Respective memories 216A-C may be implemented as, for example, a hard drive, a random access memory (RAM), read-only memory (ROM), an optical drive, an external storage device, and/or other storage devices. It is noted that processor(s) 214A-C may be designed to implement in hardware one or more features that would otherwise be stored as code instructions by respective memories 216A-C.

Beacon device 204 may include a data storage device 220A that stores data, for example, split-key pair repository 222A that stores the split-private keys (generated by splitting the private key) and public keys that are generated using encryption process that is additive homomorphic and includes a threshold decryption process, DSA key pair repository 222B that stores the generated pairs of public and private DSA keys for signing message 202, and signature-data value repository 222C that stores the computed signature-data values. It is noted that the split private keys and/or the DSA keys and/or the signature-data values may be stored by respective data storage devices of requestor device 206 and/or validator devices 208 when provided, as described herein.

Requestor device 206 may include a data storage device 220B that may store the received message(s) 202 for signing thereof, for example, individually and/or in a message repository.

Validator devices 208 may each include a data storage device 220C that stores the respective split key, for example, in a split key repository 224. It is noted that data storage device 220C may store other data, for example, the received signature-data value and/or the received message 202.

Data storage devices 220A-C may be implemented as, for example, a random access memory (RAM), read-only memory (ROM), non-volatile memory, magnetic media, semiconductor memory devices, hard drive, removable storage, optical media (e.g., DVD, CD-ROM), a remote storage server, and a computing cloud. It is noted that some data and/or code may be stored in respective data storage devices with executable portions loaded into respective memories.

Network 230 may be implemented, for example, as one or more of: a wire based network (e.g., Ethernet), a wireless based network, the internet, a local area network, a wide area network, a virtual private network, a virtual network, a cellular network, a short range wireless network, a mesh network, and an ad-hoc network. Network 230 may be implemented using one or more protocols and/or network architectures.

One or more device 204, 206, and/or 208 may include respective user interfaces 232A-C that presents data to a user and/or includes a mechanism for entry of data, for example, one or more of: a touch-screen, a display, a keyboard, a mouse, voice activated software, and a microphone. Some devices may operate without a user interface, for example, validator devices 208 may operate without a user interface.

One or more device 204, 206, and/or 208 include a respective network interface 234A-C for communicating with network 230, for example, physical and/or virtual components, for example, one or more of, antenna(s), network interface card(s), a wire port, a virtual interface implemented in software, network communication software providing higher layers of network connectivity, an application programming interface (API), a software development kit (SDK), and/or other implementations.

At 102, a beacon device provides and signs a signature-data value. The signature-data value, and optionally an associated timestamp, is provided to (e.g., transmitted over) multiple validator devices over a network.

The signature-data value may be provided to the multiple validator devices via the requestor device, for example, in an implementation in which the beacon is not directly connected to the network but is connected to the requestor device, for example, where the beacon device is implemented as a cold wallet connected to the requestor device implemented as a hot wallet. For example, the requestor device receives the signature-data value from the beacon device. The requestor device may check that the signature-data value has not been used previously, for example, performing a look up operation in a dataset of previously used signature-data values, another example is by checking a sequence number that the beacon sends with each signature data. The requestor device may send the signature-data value to the multiple validator devices over the network.

The beacon is considered as trusted by the validator devices and/or the requestor device.

The beacon may repeatedly compute and/or generate the signature-value, which may be further signed and/or further provided to the validator devices. For example, a new signature value is generated periodically every defined time interval (e.g., every microsecond, every second, every minute, every hour, or other time intervals). Alternatively or additionally, the beacon generates the signature-value during a defined event, for example, upon initialization (e.g., reset of the beacon, connection of the beacon to a network connected node). Alternatively or additionally, after an initialization process (e.g., reset of the beacon, connection of the beacon to a network connected node), the beacon device computes and provides a defined number of instances of different signature-data values, and optionally different public keys, and corresponding private keys (when implementing additive homomorphic threshold encryption). The multiple instances enable the validator devices to sign a number of messages up to the predefined number of instances.

The beacon device is designed to increase security against malicious attack, in particular, malicious attack originating over the network. Optionally, the beacon device is connected to the network in a unidirectional manner such that traffic is transmitted from the beacon to the network but not in a direction from the network to the beacon. For example, the beacon device is designed as a "dumb" device that generates and transmits the signature-value (and/or other data such as keys) over the network, optionally once a connection is detected. The unidirectional feature reduces and/or prevents risk of attack over the network. Optionally, the beacon device is implemented as a cold offline wallet that is optionally connected to the network via a hot wallet implemented, optionally implemented as the requestor device. It is noted that since the hot wallet is connected to the network, it is prone to malicious attack, and so cannot be trusted fully. The cold wallet implementation reduces risk of attack, by connecting the cold wallet to the hot wallet for short time intervals when needed, for example, to perform transactions. The cold wallet is kept offline and disconnected from the network the rest of the time, preventing access via the network by an attacker. Optionally, the beacon device provides one or more instances of the signature-data value (and/or other data such as instances of different public keys, and corresponding private keys) without being triggered by the message and/or other indication that the signature-data is required, for example, providing the signature-value at regular intervals and/or initialization events. The disconnect from the message may further reduce risk of malicious activity, for example, by preventing a situation where the message is generated as a malicious attack. Alternatively, the beacon device may be set to be always alive, generating multiple signature-data values.

The signature-data value may be provided to the validator devices using, for example, an encryption process and/or a secret sharing process. The secret sharing process may be additive homomorphic.

The secret sharing process may be implemented, for example, for ECDSA and/or EdDSA.

The secret sharing process described below is used with each pair of a certain signature-data value selected from multiple signature-data values and a certain private key selected from multiple private keys used to compute the respective partial-open decrypted values, without the validator devices knowing the pair of the certain signature data value and the certain private key that is selected.

The secret sharing process described below is designed to split and share two secret values between a number of participating devices denoted N (e.g., validator devices), where all of the N participating devices are required in order to reconstruct the secrets. Using the described secret sharing process, even when N−1 of the N participating devices are malicious, the N−1 malicious devices cannot obtain the secret even when maliciously collaborating with each other.

The secret sharing process described herein satisfies level 1 homomorphic secret sharing, which refers to the property that the split of the secret using the secret sharing process allows for a single multiplication operation between the split parts of the secret that is equal to an operation of the whole (i.e., unsplit) secret.

The secret sharing process described herein enables selecting any one of a first encrypted value and any one of a split second encrypted value (e.g., splitting multiple encrypted private keys and selecting any one of the split encrypted private keys, and splitting multiple signature-data values and selecting any one of the split signature-data values), and providing the selected split first and second values (e.g., selected encrypted key and the selected split signature-data value) to multiple devices (e.g., validator devices) using the secret sharing process described herein satisfying the property of level-1 homomorphic secret sharing (e.g., level-1 homomorphic sum secret sharing) by enabling a multiplication operation of encrypted values.

The secret sharing process described herein may be implemented for a cryptographic process (e.g., ECDSA) that requires a multiplication operation between two secrets which are required to be kept secret. When each participating device (e.g., validator device) processes its respective portion of the secret and distributes the results, the cryptographic process may be applied to the secrets in a manner that even if N−1 participating devices are malicious, the secrets are not made available.

The secret sharing process is designed for two values that are kept secret, $k^{-1}$ and the private key denoted d. Knowing the value of at least one of $k^{-1}$ and the private key d enables controlling the private key. A secret sharing mechanism process for $k^{-1}$ and d is now described, such that with defined (e.g., agreed) constants denoted r, m, each participating device (e.g., validator device) having the shares for $k^{-1}$ and d may compute a share for $k^{-1}$ (m+r*d) which may be used to generate the real value of $k^{-1}$ (m+r*d). The secret sharing process hides the real value of $k^{-1}$ and d, which cannot be restored without malicious collaboration of all the participating devices.

The secret sharing process enables having multiple different values of $k^{-1}$ and multiple different values for d, such that the secret sharing mechanism may work for each pair of sharings of $k^{-1}$ and d, without knowing which pair will be used.

The sum secret sharing scheme is used, such that for the value d the shares uphold:

$$\sum_i^n d_i = d$$

The described secret sharing mechanism is homomorphic for addition, but not for multiplication. The reason is that for secret sharing of k, d:

$$\sum_{i}^{n} d_i = d$$

$$\sum_{i}^{n} k_i = k$$

The following equation holds:

$$\sum_{i}^{n} d_i k_i \neq k * d = \sum_{i}^{n} d_i \sum_{i}^{n} k_i$$

since:

$$\sum_{i}^{n}\left(d_i \sum_{j \neq i}^{n} k_j\right) \neq 0$$

The above is a linear equation, which may be used as a requirement for the secret sharing process. For example, the following may be calculated:

$$d_1 = \left(\sum_{i=2}^{n}\left(d_i \sum_{j \neq i}^{n} k_j\right)\right) / \left(\sum_{j=2}^{n} k_j\right)$$

while making sure the following equation holds:

$$\sum_{i}^{n} d_i = d$$

Which results in the property:

$$\sum_{i}^{n}\left(d_i \sum_{j \neq i}^{n} k_j\right) = 0$$

Based on the above, the shares may be selected to provide level 1 homomorphic encryption. For securing the described secret sharing implementation, a uniform selection may be performed from the shares (e.g., all the shares) that hold the following properties:

$$\sum_{i}^{n} d_i = d$$

$$\sum_{i}^{n} k_i = k^{-1}$$

$$\sum_{i}^{n}\left(d_i \sum_{j \neq i}^{n} k_j\right) = 0$$

The described secret sharing implementation is secure against t−1 curious participants. For a certain selected private key d for secret sharing thereof, there may be multiple $k^{-1}$ sharings, and for a certain selected $k^{-1}$ for secret sharing thereof there may be multiple private key d sharings. The described secret sharing process below generates multiple sharing for any d and multiple sharing for any $k^{-1}$ which still holds the level-1 homomorphic secret sharing property with any pair.

A "good sharing" (i.e., level-1 homomorphic secret sharing) property denoted R is defined as follows:

$$R(da, ka) <= > \sum_{i}^{n}\left(d_i \sum_{j \neq i}^{n} k_j\right) = 0$$

Where da denotes the sharing of d and ka denotes the sharing of $k^{-1}$. c*ka denotes multiplying c with each share, and c+ka denotes adding c/n to each share, and ka'+ka denotes the same as vector addition (r=ka'+ka: ri=ka'i+kai).

For any constant denoted c, the following hold:

$R(da,ka) \rightarrow R(da,c*ka)$ $R(da,ka) \rightarrow R(c*da,ka)$

Therefore, for any constants, denoted $c_{1,2}$:

$R(da,ka) \rightarrow R(c_1*da,c_2*ka)$

Based on the above, it is noted that there may be multiple $k^{-1}$ sharings that works with multiple d sharings. However, the problem is that each participant device (e.g., validator device) will know the linear ratio between each of the $k^{-1}$'s. It is noted that:

$(R(da,ka),R(da,ka')) \rightarrow R(da,ka+ka')$ $(R(da,ka),R(da',ka)) \rightarrow R(da+da',ka)$ When the following relationships hold (e.g., are selected and/or computed):

$R(da,ka), R(da,ka'),R(da',ka),R(da',ka'), \text{sum}(ka) \neq 0,$
$\text{sum}(ka') \neq 0, \text{sum}(da) \neq 0, \text{sum}(da') \neq 0$ for any
constant denotes $c1,c2,c3,c4$ $R(c1*da+c2*da',c3*ka+c4*ka')$ When the 4 linear equations above are upheld, (size of the field) key sharing options are provided.

The above described key sharing process may be summarized as follows:

Given: (da,ka), R(da,ka'), R(da',ka), R(da',ka')
Given: at least one of a certain k and/or a certain private key d
Generate: c1 at uniformly.
Calculate: c2=(k−c1*sum(ka))/(sum(ka'))
New key sharing is denoted: c1*ka+c2*ka'

The following is a mathematical proof for the above described secret sharing process:

$$k = \sum_{i}^{n}(c_1 * ka_i + c_2 * ka_i') =$$

$$c_1 \sum_{i}^{n}(ka_i) + c_2 \sum_{i}^{n}(ka_i') = c_1 * sum(ka) + c_2 * sum(ka') =$$

$$c_1 * sum(ka) + (k - c_1 * sum(ka))/(sum(ka')) * sum(ka') =$$

$$c_1 * sum(ka) + k - c_1 * sum(ka) = k$$

Other examples of secret sharing processes include, for example, implemented according to Shamir's Secret Sharing (e.g., as described with reference to https://cs(dot)jhu(dot)edu/~sdoshi/crypto/papers/shamirturing(dot)pdf), and/or Sum Secret Sharing.

The encryption process may be used, for example, when communication channels between the beacon and the validator devices are unsecure. The secret sharing process may be used, for example, when the communication channels between the beacon and the validator devices are secure.

The threshold decryption process may be implemented, for example, based on a Paillier process. The threshold decryption process, which uses the split-keys, enables the validator devices to open the encrypted signature-data together without sharing the key with each other, for example, as described with reference to https://iacr(dot)org/archive/pkc2003/25670279/25670279(dot)pdf.

In terms of mathematical formalities, the additive homomorphic property of the encryption process and/or of the secret sharing process may be described as follows: given two encrypted values denoted E(a) and E(b), both encrypted with the same private key, a binary operation marked as $+_E$ is such that $E(a)+_E E(b)=E(a+b)$. Another operation marked as $*_E$ is such that $a*_E E(b)=E(a*b)$, where a denotes any member of the message space.

Optionally, when the encryption process is implemented, the beacon devices generates a public key (e.g., multiple instances of different public keys), and a corresponding private key (e.g., a corresponding private key for each of the public keys), optionally using the threshold encryption process, for example, based on Paillier. The private key is split into multiple split-keys, which are each provided to a different validator device. The public key may be provided to all validator devices and/or to the requestor device.

Optionally, another key pair is created, for example, based on EdDSA and/or ECDSA.

Different implementations of the signature-data value may be used.

Optionally, when DSA is implemented, the signature-data value includes a DSA-private key. The DSA-private key may be encrypted with the public key corresponding to the private key that is split into the multiple split-private keys.

The number of the split-private keys may correspond (e.g., equal, at least equal) to the number of validator devices.

Optionally, when the signature-data is based on the encryption process, the signature-data value includes one or more (optionally all) of the following components: (i) an inverse of a random value encrypted with the public key corresponding to the private key that is split into the split-private keys; and (ii) an encryption of the following with the public key corresponding to the private key that is split into the multiple split-private keys: a product of the inverse of the random value and a hash of a known constant point raised to the power of the random value and a DSA-private key computed by the beacon device using the DSA process; and (iii) the hash of a known constant point raised to the power of the random value.

To help understand mathematical notations used below, the following is an exemplary mathematical representation of the final computed signature of the message (e.g., computed in 112):

When d denotes a certain private key, and m denotes the message, where g denotes a known constant point, k denotes a random number, and H denotes a hash function (e.g., sha256). H'(p) denotes a specific hash of a point p which is part of the DSA algorithm (for example, in ECDSA, H' denotes the x coordinate of p)

$$(r,s)=(H'(g_k), k^{-1}*(H(m)+H'(g^k)*d)),$$ which is noted to be the same as:

$$(r,s)=(H'(g^k), k^{-1}*H(m)+k^{-1}*H'(g^k)*d)$$

The following is an exemplary process for generating the signature-data based on the threshold encryption process and/or DSA performed by the beacon (e.g., ECDSA).

1. Choose a random value denoted k
2. Compute $k^{-1}$, optionally denoting an inverse of the value k in the underlying group, for example, $k^{-1}$ mod a certain value of n, where n may denote the number of validator devices.
3. Encrypt with the public threshold additive homomorphic encryption (e.g., Paillier) key to generate the value denoted $E(k^{-1})$. Alternatively, $k^{-1}$ is secret shared using an additive homomorphic secret sharing process (e.g., Shamir Secret Sharing and/or Sum Secret Sharing).

The operation denotes E( ) may refer to encryption with the threshold additive homomorphic encryption process and/or secret shared using the additive homomorphic secret sharing process.
4. Compute $g^k$, where g denotes a known constant point
5. Compute $k^{-1}*H'(g^k)$
6. Encrypt with the public threshold encryption (e.g., Paillier) key to generate the value denoted $E(k^{-1}*H'(g^k)*d)$. Alternatively, the value is secret shared.
7. The signature-data value includes the value mathematically denoted $E(k^{-1})$, $H'(g^k)$, $E(k^{-1}*H'(g^k)*d)$. Alternatively, the signature-data value is mathematically denoted as $E(k^{-1})$, $E(k^{-1}*H'(g^k)*d)$. (In this case, $H'(g^k)$ is sent only to the requestor).

Alternatively, the above process may be implemented using secret sharing. Rather than encrypting the value (e.g., $k^{-1}$) using the threshold encryption process to enable dividing the value amongst multiple validator devices (where after additive homomorphic operations the validator devices may decrypt the encrypted value, as described herein), the value (e.g., $k^{-1}$) is provided using secret sharing. The secret sharing is additive homomorphic, and after operations as described herein, each validator device is able to access the secret value.

Optionally, the DSA-private key (e.g., EdDSA and/or ECDSA) is generated using an hd-tree. Multiple keys are generated using the hd-tree, optionally without using level one Paillier. The hd-tree enables deriving ECDSA and/or EdDSA private keys from a base ECDSA and/or EdDSA private key and additional data called chaindata. The private key device owner may give any other device the ability to derive the matching public key from the base public key by sending the device the chaindata.

The hd-tree enables deriving DSA-private keys from a base DSA-private key (e.g., deriving EdDSA-private keys from the base EdDSA-private key and/or deriving ECDSA-private keys from the base ECDSA-private key) using a derivation index value. The derivation index value is provided to the validator devices for locally computing the signature-data value.

In terms of mathematical notation:

PrivateKey=d

PublicKey=$g^d$

Generating by the derivation index and the PublicKey a value denoted i:

NewPrivateKey=PrivateKey+i=d+i

NewPublicKey=PublicKey*$g^i=g^d*g^i=g^{d+i}$)

When the keys are generated using the hd-tree, the signature-data value may be implemented based on the following mathematical representation: $E(k^{-1})$, $E(k^{-1}*H'(g^k))$, $E(k^{-1}*H'(g^k)*d)$, where given a certain value of i, the following may be calculated: $i*_E E(k^{-1}*H'(g^k)) +_E E(k^{-1}*H'(g^k)*d) = E(k^{-1}*H'(g^k)*(d+i))$. The process described herein is implemented using $E(k^{-1})$, $E(k^{-1}*H'(g^k)*(d+i))$.

It is noted that $E(k^{-1}*H'(g^k))$ may be computed by $k^{-1}*_E E(H'(g^k))$.

Optionally, when the public key and the private key that is split into the multiple split-private keys are computed based on the threshold decryption process, the beacon device generates and/or stores multiple instances of key pairs, for example, acting as a multi-party computation (MPC) wallet with many keys. The multiple keys are generated without necessarily generating a new and different signature-data value for each private key, for example, a single signature-data value is generated for a set of multiple keys. The same (e.g., single) signature-data value is used only once for a selected single key of the set of multiple keys. The following is an exemplary process for implementing the multiple set of keys with same (e.g., single) signature-data value. Multiple DSA (e.g., EdDSA and/or ECDSA) key pairs are generated. Each private key of the key pairs is encrypted to create multiple encrypted private keys. The encrypted private keys are provided to the plurality of validator devices. One of the encrypted private keys is selected, for example, by the beacon and/or by the requestor device. The signature-data value does not include the selected private key. An indication of the selected encrypted private key is provided to the validator devices. The partial open decrypted value (e.g., as described with reference to 108) is computed by each respective validator device using the selected encrypted private key and the signature-data value which does not include the selected private key.

When the multiple pairs of keys with same signature-data value is implemented, the threshold encryption process that is used allows one multiplication, for example, level one additive homomorphic encryption, for example, in the secret sharing process described herein with reference to 102 of FIG. 1, and/or above as described with reference to https://www(dot)semanticscholar(dot)org/paper/Using-Level-1-Homomorphic-Encryption-to-Improve-DSA-Boneh-Gennaro/a57ae12ec05a71b22ce6504dce29c37c3f86d6fc In terms of mathematical representation, the beacon provides $E(d_i)$ for each of the private keys of the set of keys. The signature-data value may be implemented as $E(k^{-1})$, $H'(g^k)$, $E(k^{-1}*H'(g^k))$. The beacon and/or requestor device selects one of the keys and provides an indication of the selected key to the validator devices. Each validator devices computes a respective partial open (e.g., in 108) as $H(m)*_E E(k^{-1}) +_E E(k^{-1}*H'(g^k))*_{E\_level\_1} E(d_i)$. The secret values (e.g., private keys and signature-data value) may be shared using the level 1 homomorphic sum secret sharing process, for example, as described herein.

An implementation using EdDSA MPC is now discussed, optionally in the context of the beacon device implemented as a GK8 wallet. The implementation may be based on GK8 MPC with an underlying EdDSA signature (e.g., over the Ed25519 elliptic curve). It is noted that EdDSA signatures are a variant of Schnorr signatures, and other suitable implementations may be used. EdDSA may be selected over ECDSA, for example, when ECDSA involves the problem of distribution of inverting a group element in a distributed manner, which does not exist with Schnorr signatures such as EdDSA.

The following is a summary explanation of the keys (both private and public), as well as the signature and verification process of an EdDSA signature. The private key of an EdDSA signature scheme is a b-bit string denoted k, for some security parameter denoted b. The public key is denotes as $A=s \cdot B$ (it is noted that multiplication by a scalar is defined by the underlying group), where B denotes a pre-defined point on the underlying curve, and $s=H_0, \ldots, b-1(k)$ for a pre-defined target collision-resistant hash function denoted H (e.g., for Ed25519 SHA-512 may be implemented). An EdDSA signature on message denoted M is denoted as the pair (R, S) such that:

$R=r \cdot B$, where $r=H(Hb, \ldots 2b-1 \| M)$.

$S=r+H(R\|A\|M) \cdot s \bmod L$, where L denotes the order of the underlying group.

Verification of an EdDSA signature is performed by checking if the following equation holds:

$S \cdot B = R + H(R\|A\|M) \cdot A$

It is noted that in the actual implementation M denotes a hashed version of the original message m. Further details of EdDSA are found, for example, in RFC 8032.

It is noted that the implementation described herein, based on the beacon device, validator devices, and requestor device where any one of the validator devices may act as the request device may be uneven, as one device may ask for signatures on any message (as opposed to standard approaches where the message to be signed is assumed known by all parties). This is handled outside of the MPC, so it may be assumed that the co-signers (i.e., validator devices) may verify that requests for participation in the threshold signature are legal. To achieve a threshold signature, an additively-homomorphic scheme which admits threshold decryption which involves one stage of partial decryption, and one stage of combining all of the partially-decrypted shares to form a decryption, is implemented. For example, a secret-sharing scheme (e.g., Shamir secret sharing) and/or an additively-homomorphic encryption scheme (e.g., Paillier) and/or any primitive that fits and is secure. The encryption/cipher of this scheme is denoted as E, where the additively homomorphic action is denoted by $+_E$ and the multiplication of some element denoted g by a scalar denoted e is denoted by $g^e$.

The implementation of EdDSA MPC is now briefly discussed. It is noted that r is defined as a deterministic value given the message and private key. r may be completely random for performing a threshold signature. As implemented here, r may be random rather than being shared on-the-fly, which is technically difficult or impossible since it depends on the message. In some implementations, the requestor acts as one of the validator devices required to co-sign. The message to be signed is denoted as in with M denoting the hashed message. The beacon device samples a private key denoted k, computes s as above, and shares the value using the underlying additive homomorphic scheme. Let si denote the share of validator device denoted i. It is noted that when an additively-homomorphic encryption scheme is used then the sharing is of the decryption key, and all validator devices receive E(s). The beacon device may broadcast the public key denoted A. The beacon device may continuously sample r's randomly, and shares (i, E(r),R) [i.e., signature-data], where R is as computed as above, and i is a unique index. The requestor device may provide (e.g., broadcasts) the pair m, i, where i denotes an index of an unused signature data tuple and m denotes the message to be signed (e.g., as in 106). Upon receiving a signature request each validator device may make sure that the message m is a legal one and that i is an unused signature data tuple (e.g., as in 108). Let E(r),R denote the pair indexed by i. Each validator device performs a partial decryption of the following computation (e.g., as in 108):

$$E(S)=E(r)+E(s)^{H(||A||M)}=E(r+H(R||A||M)\cdot r)$$

Each partial-open decryption is provided to the requestor device (e.g., as in 110). Upon receiving all partial-open decryptions (e.g., the requestor device may computes its own partial-open decryption) the requestor device combines all shares to get S (e.g., as in 112). The requestor device may publish (R, S) as the signature on m (e.g., as in 114).

At 104, a message for signing is received by the requestor device. The message may be received, for example, from a third party device, from the requestor device itself, and/or from other devices. The message may be any message for digital signing to increase security of the messages. For example, the message may be a transaction of cryptocurrency between two digital wallets. The transaction record may be stored in the blockchain dataset. In another example, the message may be an entry in a database that is signed for extra security.

The requestor device may act as a hot wallet, that may be connected to the beacon, for example, the beacon implemented as a cold wallet.

At 106, the message for signing is provided by the requestor device to multiple validator devices. The message for signing is provided in a single request session over the network.

The message may be transmitted to a number of validator devices required for joint-signing, where all of the validator devices are required to sign the message. Alternatively, the message may transmitted to a number of validator devices that is greater than a minimum threshold number of validator devices required for joint-signing of the message. The message is signed when at least the minimum number of validator devices each sign their respective portion.

Each validator device receives the message for signing in the single request session.

Optionally, the requestor device is one of the validator devices. Alternatively, the requestor device is not one of the validator devices.

The validator devices, which are connected to the network, are trusted by the requestor device (e.g., the hot wallet), but may be vulnerable to malicious attack over the network. The use of multiple validator devices to sign the message mitigates the risk of malicious attack.

At 108, each one of the validator devices computes a respective partial-open decrypted value of the signature-data value and the message.

The respective partial-open decrypted value is computed according to the implementation used to provide the signature data-value, for example, using the respective split-private key applied to the signature-data value and the message, and/or using the respective partial-open decrypted value based on the secret sharing process.

Optionally, prior to the computation of the respective partial-open decrypted value, each one of the validator devices checks whether the message qualifies for signing by the respective validator device. For example, the message may be evaluated according to a respective set-of-rules defining when the respective validator device signs the message, for example, the value of the cryptocurrency transaction is within a range and/or below a maximal value, the originating address of the message is valid, the destination address of the message is valid, the originating wallet has sufficient cryptocurrency stored therein to allow the cryptocurrency transaction to another wallet, and the like. In another example, the message is presented on a display for viewing by a human operator. The human operator may manually approve signing of the message, or decline signing of the message, for example, by pressing an approve or decline icon presented on the display.

Optionally, each one of the validator devices validates that the beacon device signed the signature-data value and/or that the signature-data value has not been previously used by the respective validator device.

Each one of the validator devices may perform its own checking and/or validation process independently of other validator devices.

When the signature-data is based on the threshold encryption process and/or DSA (e.g., ECDSA), the partial-open decrypted value may be computed as follows. First, the following is computed using values extracted from the signature-data value: $H(m)*_E E(k^{-1})+_E E(k^{-1}*H'(g^k)*d)=E(k^{-1}*H(m)+k^{-1}*H'(g^k)*d)$ ($==H(s)$). The partial-open of $E(k^{-1}*H(m))+k^{-1}*H'(g^k)*d)$ is computed by each respective validator device using its own respective split-key, for example, as described with reference to https://people(dot)csail(dot)mit(dot)edu/rivest/voting/papers/DamgardJurikNielsen-AGeneralizationOfPailliersPublicKeySystemWithApplicationsToElectronicVoting(dot)pdf.

Alternatively, the signature-data is provided using secret sharing, as described herein.

At 110, each respective partial-open decrypted value computed by each respective validator device is provided to the requestor device in a single response session.

The requestor device receives in the single response session from each one of the plurality of validator devices, a respective partial-open decrypted value computed for the signature-data value and the message.

At 112, the requestor device aggregates the multiple partial-open decrypted values received from the validator devices to compute the digital signature of the message.

The requestor device computes an unencrypted signature of the message from the partial open decrypted values.

Optionally, the requestor device validates that the digital signature (computed by aggregating the partial-open decrypted values received from the validator devices) is a valid signature of the message, for example, validating that none of the validator devices attempted a malicious activity.

Optionally, the requestor device validates that all of the participating devices correctly computed the respective partial open. Each respective partial-open decrypted value provided by each respective validator device may include an indication of proof that the respective validator device computed their respective partial open, for example, using zero knowledge proof and/or the process described below. The indication of proof may be provided, for example, in a single message and/or as metadata. For example, using a secret sharing process (e.g., sum secret sharing), each validator device gets its own unique values $a_i$, $b_i$ (in the ECDSA case for example, ($a_i$:=respective share of $k^{-1}*r*d$) and ($b_i$=respective share of $k\hat{\ }-1$)), and returns the value $b_i+(a_i*H(m))$, where H denotes a hash function as described herein, and m denotes the message to sign as described herein. $a_i$ and $b_i$ denote values that may be obtained, for example, from the beacon device and/or may be predefined values. The beacon device may send the values $g^{ai}$ and $g^{bi}$ to the requestor device, where g denotes for example, a point on the curve when implementing for example, ECDSA, as described herein. When the validator of the digital signature fails, the certain participating device causing the failure may be detected and excluded from further message signing. For example, the following relationship is validated for each participating device:

$$g^R = A_i^{H(m)} * B_i$$

Where
R:=Message sent by the i'th validator
$A_i = g^{ai}$ sent by the beacon to the requestor
$B_i = g^{bi}$ sent by the beacon to the requestor When the relationship is not met for a certain participating device, the certain participating device may be designated as malicious and excluded from further signing of messages.

Optionally, the digital signature of the message is computed only when all of the number of the validator devices provide respective partial-open decrypted values (i.e., N out of N). It is noted that Sum Secret Sharing is compatible with N out of N.

Alternatively, the digital signature of the message is computed when a number of validator devices above the minimal threshold number of devices provide respective partial-open decrypted values (i.e., K out of N). It is noted that Sum Secret Sharing is not compatible with K out of N, and so another process (e.g., as described herein) should be used. The technical challenge with implementing K out of N is that if a hacker is able to access less than K (e.g. two) of the validator devices (e.g., in a 6 out of 10 situation), the hacker may sign a first message and a second message using the same signature-data value (with the other validator devices). Using the same signature-data value twice enables the hacker to figure out the private key. In general, for a K out of N situation, the hacker may attack a number of validator devices denoted by max(1,2K−N) in order to be able to figure out the private key. One possible solution, when K and N are small or when K is close to N (i.e., when the operation N choose K is small for computational efficiency), is to divide the validator devices into two or more groups. A different key, which is split into multiple sub-keys, is created for the different groups. Each different key is associated with a different signature-data value. Alternatively, different signature-data values are generated for the different groups, where the requestor device is aware of which validator devices are members of which group. In another solution, which may be comprised with the first solution of dividing into groups, is to defined a minimum security level of a number of validator device out of a total number of validator devices required to provide respective partial-open decrypted values for computing of the digital signature of the message. The minimum security level is increased to a minimum threshold according to a set of rules, for example, at least (K+N)/2 validator devices. The second solution may be used, for example, when the number of K and/or N is large, for example, when K is greater than half of N. When the second solution is combined with the first solution of dividing into groups, where each group has a number of validator devices denoted A, the set of rules defining the minimum threshold may be denoted as (K+A)/2.

In terms of mathematical representation, the unencrypted signature of the message is computed using the following equation:

$$s = k^{-1} * H(m) + 1k^{-1} * H'(g^k) * d$$

In terms of mathematical representation, the requestor device validates that $(r,s) = (H'(g^k), k^{-1}*H + k^{-1}*H'(g^k)*d)$ is a valid signature of m.

At 114, the requestor device may provide the computed signature of the message, for example, published, made publicly accessible, provided to the requesting third party device, and/or stored in the blockchain.

In terms of mathematical representation, (r,s) is provided.

Figure 3:
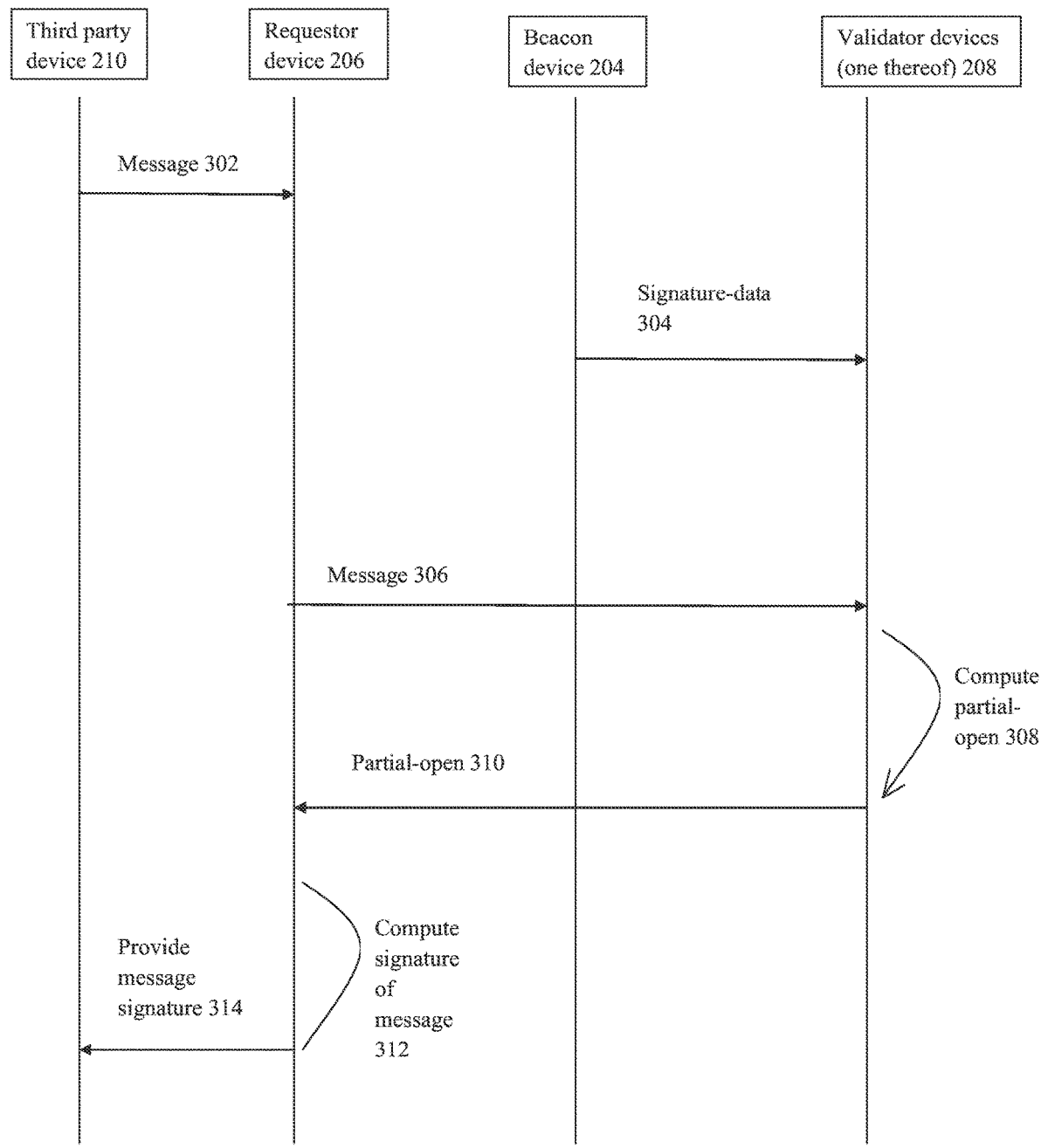
FIG. 3 is a dataflow diagram of a process for digital signing of a message using signature-data provided by a beacon device and a single request session by a requestor device and a single response session from each of multiple validator devices, in accordance with some embodiments of the present invention.

Reference is now made to FIG. 3, which is a dataflow diagram of a process for digital signing of a message using signature-data provided by a beacon device and a single request session by a requestor device and a single response session from each of multiple validator devices, in accordance with some embodiments of the present invention. FIG. 3 depicts an overall system level dataflow between multiple devices, including the beacon device, the requestor device, validator devices, and optionally a third party device. One or more features of the dataflow diagram of FIG. 3 may correspond to other features described herein, for example, as described with reference to FIG. 1. The dataflow depicted by FIG. 3 may be implemented by components of system 200 described with reference to FIG. 2.

At 302, a message for signing is received, for example, sent by third party device 210 (and/or another device) to requestor device 206, for example, as described herein with reference to 104 of FIG. 1.

At 304, a signature-data value generated by beacon device 204 is provided to multiple validator devices 208. The signature-data value may be provided, for example, via an encryption process and/or via a secret sharing process, as described herein, for example, as described herein with reference to 102 of FIG. 1.

It is noted that 302 and 304 may be performed independently of one another, and in different order, for example, 304 occurring before 302, 302 occurring simultaneously with 304, and/or 302 and 304 occurring at different times without regards to each other.

At 306, the message for signing is provided by requestor device 206 to validator devices 208 in a single request session, for example, as described herein with reference to 106 of FIG. 1.

At 308, each one of the validator devices 208 computes a respective partial-open decrypted value of the signature-data value and the message, for example, as described herein with reference to 108 of FIG. 1.

At 310, the partial-open decrypted values computed by the validator devices 208 are provided to requestor device 206 in a single response session, for example, as described herein with reference to 110 of FIG. 1.

At 312, requestor device 206 aggregates the received partial-open decrypted values to compute the digital signature of the message, for example, as described herein with reference to 112 of FIG. 1.

At 314, requestor device 206 provides the digital signature of the message, for example, to third party device 210, for example, as described herein with reference to 114 of FIG. 1.

Figure 4:
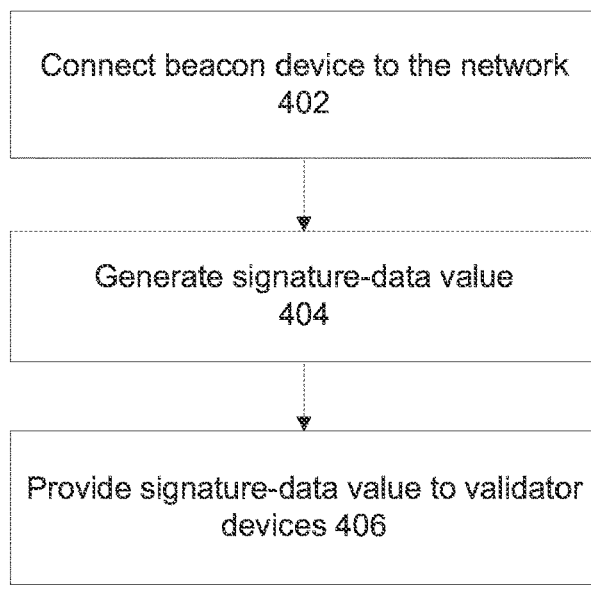
FIG. 4 is a flowchart of a method for digital signing of a message using signature-data provided by a beacon device, from the perspective of the beacon device, in accordance with some embodiments of the present invention.

Reference is now made to FIG. 4, which is a flowchart of a method for digital signing of a message using signature-data provided by a beacon device, from the perspective of the beacon device, in accordance with some embodiments of the present invention. One or more features of the method of FIG. 4 may correspond to other features described herein, for example, as described with reference to FIG. 1. The process depicted by FIG. 4 may be implemented by components of system 200 described with reference to FIG. 2.

At 402, the beacon device may be connected to the network. The beacon device may be offline and connected to a network connected node, for example, a cold wallet connected to a hot wallet. The beacon device may be connected to the network by being activated, for example, triggering an initialization procedure.

At 404, the beacon device generates one or more signature-data values. The signature-data value(s) may be generated periodically, and/or triggered by the initialization procedure, as described herein. Individual signature-data values may be generated periodically, and/or multiple signature-data values may be generated together for example upon initiation, as described herein.

Other data may be generated, for example, public-private key pairs, as described herein. The private key may be split into multiple split-keys, as described herein.

At 406, the signature-data value are provided to the validator devices, for example, using the encryption process and/or secret sharing process, as described herein.

Other data, for example, the multiple split-keys may be provided to the validator devices, as described herein.

Figure 5:
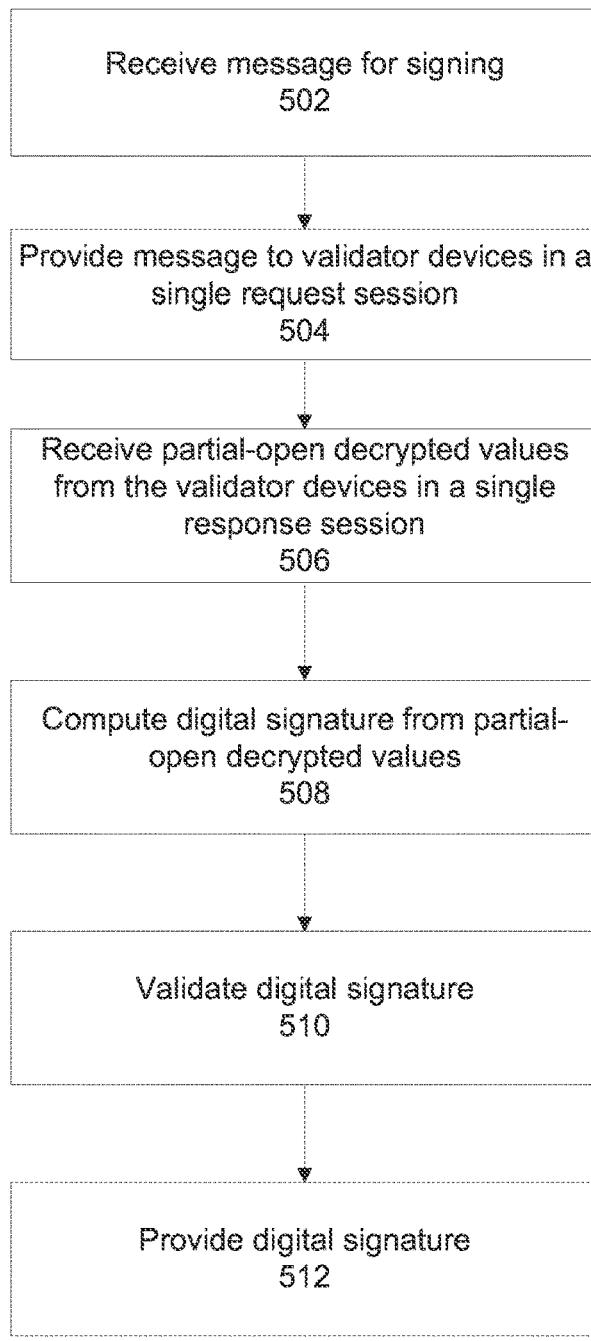
FIG. 5 is a flowchart of a method for digital signing of a message using signature-data provided by a beacon device, from the perspective of a requestor device, in accordance with some embodiments of the present invention.

Reference is now made to FIG. 5, which is a flowchart of a method for digital signing of a message using signature-data provided by a beacon device, from the perspective of a requestor device, in accordance with some embodiments of the present invention. One or more features of the method of FIG. 5 may correspond to other features described herein, for example, as described with reference to FIG. 1. The process depicted by FIG. 5 may be implemented by components of system 200 described with reference to FIG. 2.

At 502, the requestor device receives the message for signing, for example, from a third party device.

At 504, the requestor device provides the message to multiple validator devices, in a single request session.

At 506, the requestor device receives multiple partial-open decrypted values from the multiple validator devices (i.e., a respective partial-open decrypted value from each validator device).

At 508, the requestor device computes the digital signature of the message from the received partial-open decrypted values. The request device may aggregate the received partial-open decrypted values to compute the digital signature.

An unencrypted signature of the message may be computed from the partial open decrypted values.

At 510, the requestor device may validate that the digital signature is a valid signature of the message.

At 512, the digital signature is provided, for example, to the originator of the message for signing, such as the third party device.

Figure 6:
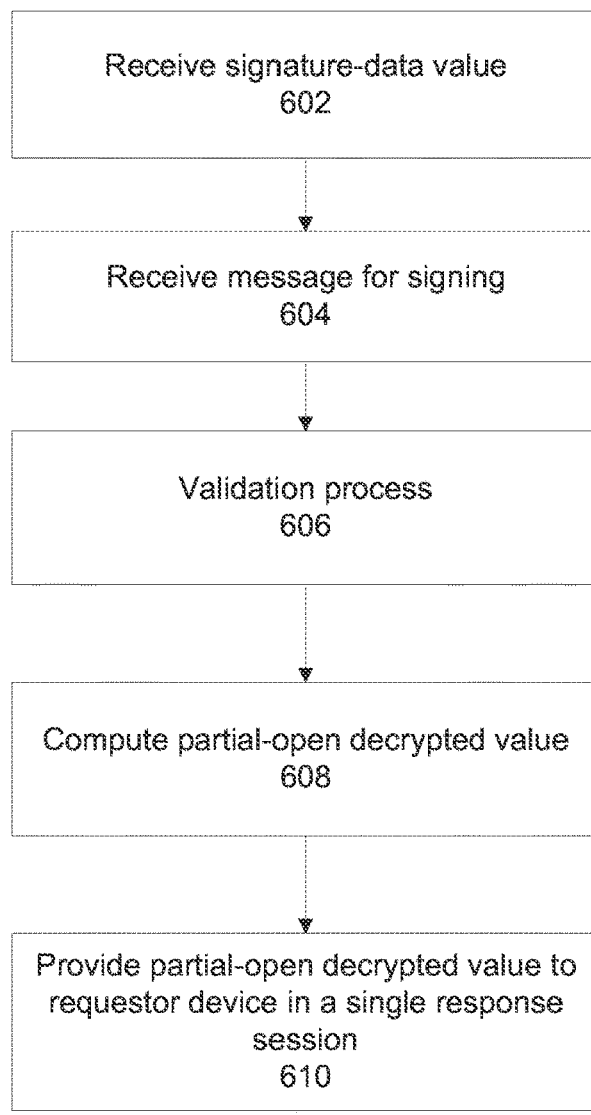
FIG. 6 is a flowchart of a method for digital signing of a message using signature-data provided by a beacon device, from the perspective of each validator device, in accordance with some embodiments of the present invention.

Reference is now made to FIG. 6, which is a flowchart of a method for digital signing of a message using signature-data provided by a beacon device, from the perspective of each validator device, in accordance with some embodiments of the present invention. Each validator device may perform one or more features of the method of FIG. 6. One or more features of the method of FIG. 6 may correspond to other features described herein, for example, as described with reference to FIG. 1. The process depicted by FIG. 6 may be implemented by components of system 200 described with reference to FIG. 2.

At 602, each validator device receives the signature-data value generated by the beacon, for example, via an encryption process and/or via a secret sharing process.

Other data may be received, for example, a respective split-private key and/or public key, as described herein.

At 604, each validator device receives the message for signing in a single request session.

At 606, each respective validator device may perform one or more validation processes before signing the message.

Optionally, each respective validator device may check whether the message qualifies for signing. Each validator device may perform its own independent checking, for example, using its own set of rules. It is noted that for some messages, some validator devices may determine the message qualifies for signing, and other validator devices may determine that the message not does qualify for signing.

Alternatively or additionally, each validator device may check that the beacon device signed the signature-data value and that the signature-data value has not been previously used.

At 608, each validator device computes a respective partial-open decrypted value of the signature-data value and the message.

At 610, each validator device provides the respective partial-open decrypted value to the requestor device in a single response session.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant message signing will be developed and the scope of the term message signing is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A requestor device for digital signing of a message including a transaction of cryptocurrency, comprising:
   at least one hardware processor executing a code for:
      transmitting the message for storage for signing thereof, in a single request session over the network to each one of a plurality of validator devices;
      wherein a beacon device connected to the network computes and transmits over the network to each one of a plurality of validator devices a signature-data value computed and signed by the beacon device;
      receiving in a single response session from each one of the plurality of validator devices, a respective partial-open decrypted value computed for the signature-data value and the message; and
      aggregating the partial-opens decrypted values received from the plurality of validator devices to compute the digital signature of the message;
      validating that the beacon device signed the signature-data value and that the signature-data value has not been previously used.

2. The requestor device of claim 1, further comprising code for identifying which of the plurality of validator devices is malicious when the digital signature is not validated, by comparing, for each respective validator device of the plurality of validator device, a first value computed using unique values for the respective validator device provided by the beacon device and using the message, with a second value computed using an indication of proof provided by the respective validator device based on the unique values and the message.

3. The requestor device of claim 1, further comprising code for validating that the digital signature computed by aggregating the partial-open decrypted values received from the plurality of validator devices is a valid signature of the message.

4. A system for digital signing of a message including a transaction of cryptocurrency, comprising:
   a plurality of validator devices, each including at least one hardware processor executing a code for:
      receiving from a beacon device over a network a signature-data value computed and signed by the beacon device;
      receiving the message for signing thereof from a requestor device over the network in a single request session;
      computing a respective partial-open decrypted value of the signature-data value and the message; and transmitting the respective partial-open decrypted value to the requestor device in a single response session,
      validating that the beacon device signed the signature-data value and that the signature-data value has not been previously used;
   wherein the requestor device aggregates the partial-open decrypted values received from the plurality of validator devices to compute the digital signature of the message.

5. The system of claim 4, further comprising code for checking whether the message qualifies for signing by each respective validator device of the plurality of validator devices according to a respective set-of-rules.

6. A system for digital signing of a message including a transaction of cryptocurrency, comprising:
   (A) at least one hardware processor of a beacon device executing a code for:
      computing and transmitting over a network to each one of a plurality of validator devices: a signature-data value computed and signed by the beacon device;
   (B) a plurality of validator devices, each including at least one hardware processor executing a code for:
      receiving the message for signing thereof from a requestor device over the network in a single request session;
      computing a respective partial-open decrypted value for the signature-data value and the message; and transmitting the respective partial-open decrypted value to the requestor device in a single response session, wherein the requestor device aggregates the partial-open decrypted values to compute the digital signature of the message and validate that the beacon device signed the signature-data value and that the signature-data value has not been previously used.

7. The system of claim 6, further comprising code for computing and transmitting over the network to each one of the plurality of validator devices, a public key, and a respective split-private key of a plurality of split-private keys, wherein the signature-data value includes a DSA-private key computed by the beacon device using a digital signature algorithm (DSA) process, wherein the DSA-private key is at least one of: encrypted with the public key corresponding to the private key that is split into the plurality of split-private keys computed based on an encryption process that is additive homomorphic and includes a threshold decryption process; and each one of the plurality of validator devices further includes code for computing the respective partial-open decrypted value using the respective split-private key applied to the signature-data value and the message.

8. The system of claim 7, wherein a number of the plurality of split-private keys corresponds to a number of validator devices, and the digital signature of the message is computed only when all of the number of the plurality of validator devices provide respective partial-open decrypted values.

9. The system of claim 7, further comprising defining a minimum security level of a number of validator device out of a total number of validator devices required to provide respective partial-open decrypted values for computing of the digital signature of the message, increasing the minimum security level to a minimum threshold according to a set of rules, wherein a number of the plurality of split-private keys corresponds to the total number of validator devices, and the digital signature of the message is computed when the number of the plurality of validator devices provide respective partial-open decrypted values is above the minimum threshold.

10. The system of claim 7, further comprising dividing a total number of validator devices into at least two groups, providing by the beacon device a unique signature-data value for each of the at least two groups, wherein the digital signature of the message is computed only when all of the validator devices of each group provide respective partial-open decrypted values computed using respective unique signature-data values for each of the at least two groups.

11. The system of claim 7, wherein:
the message for signing thereof is transmitted by a requestor device, in a single request session over the network to each one of the plurality of validator devices;
a respective partial-open decrypted value of the signature-data value and the message is received by the requestor device in a single response session from each one of the plurality of validator devices; and
the partial-open decrypted values received from the plurality of validator devices are aggregated by the requestor device to compute the digital signature of the message.

12. The system of claim 6, wherein a signature-data value and a private key are split and shared with each one of the plurality of validator devices using a secret sharing process satisfying the property of level-1 homomorphic sum secret sharing by enabling a multiplication operation of encrypted values.

13. The system of claim 12, wherein the signature-data value that is split and shared is selected from a plurality of signature-data values and the private key that is split and shared is selected from a plurality of private keys used to compute the respective partial-open decrypted values, without the plurality of validator devices knowing the certain signature data value and the certain private key that is selected.

14. The system of claim 13, wherein the signature-data value includes one of the following groups of components:
(i) an inverse of a random value encrypted with the public key corresponding to the private key that is split into the plurality of split-private keys computed based on an encryption process that is additive homomorphic and includes a threshold decryption process; and (ii) an encryption of the following with the public key corresponding to the private key that is split into the plurality of split-private keys computed based on an encryption process that is additive homomorphic and includes a threshold decryption process: a product of the inverse of the random value and a hash of a known constant point raised to the power of the random value and a DSA-private key computed by the beacon device using a DSA process; and
(i) an inverse of a random value split into a plurality of first components using a secret sharing process that is homomorphic to addition; and (ii) splitting the following into a plurality of second components using the secret sharing process: a product of the inverse of the random value and the hash of the known constant point raised to the power of the random value and an EdDSA-private key computed by the beacon device using EdDSA, wherein each of the plurality of validator devices is provided with a respective first and second component.

15. The system of claim 12, wherein the beacon device computes and transmits a plurality of instances of the signature-data value, without triggering by the message.

16. The system of claim 12, wherein the beacon device is connected to the network in a unidirectional manner such that traffic is transmitted from the beacon to the network but not in a direction from the network to the beacon.

17. The system of claim 12, wherein the beacon device is implemented as a cold offline wallet that is connected to a hot wallet implemented as the requestor device.

18. The system of claim 12, wherein the message includes a transaction of cryptocurrency for storage as a record in a blockchain.

19. The system of claim 12, wherein the beacon repeatedly computes and transmits the signature-value.

20. The system of claim 6, wherein the signature-data value is shared with each one of the plurality of validator devices using a secret sharing process that is homomorphic to addition; and
each one of the plurality of validator devices further includes code for computing the respective partial-open decrypted value based on the secret sharing process.

* * * * *